US009015413B2

(12) United States Patent
Chambliss et al.

(10) Patent No.: US 9,015,413 B2
(45) Date of Patent: *Apr. 21, 2015

(54) MANAGEMENT OF DATA USING INHERITABLE ATTRIBUTES

(71) Applicant: International Business Machines Corporation, Armonk, NY (US)

(72) Inventors: David D. Chambliss, Morgan Hill, CA (US); Chiahong Chen, Oro Valley, AZ (US); Lawrence Y. Chiu, Saratoga, CA (US); Yu-Cheng Hsu, Tucson, AZ (US); James A. Ruddy, San Jose, CA (US); Harry M. Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 210 days.

This patent is subject to a terminal disclaimer.

(21) Appl. No.: 13/633,483

(22) Filed: Oct. 2, 2012

(65) Prior Publication Data
US 2014/0095789 A1 Apr. 3, 2014

(51) Int. Cl.
*G06F 12/00* (2006.01)
*G06F 3/06* (2006.01)
(Continued)

(52) U.S. Cl.
CPC .......... *G06F 12/0897* (2013.01); *G06F 3/0608* (2013.01); *G06F 3/0611* (2013.01); *G06F 3/064* (2013.01); *G06F 3/0647* (2013.01); *G06F 3/0653* (2013.01); *G06F 3/067* (2013.01);
(Continued)

(58) Field of Classification Search
CPC . G06F 12/08; G06F 12/0866; G06F 12/0862; G06F 3/0685; G06F 3/0647
USPC ................................................. 711/117, 165
See application file for complete search history.

(56) References Cited

U.S. PATENT DOCUMENTS

| 6,032,224 A | 2/2000 | Blumenau |
| 7,225,309 B2 | 5/2007 | DeWitt, Jr. et al. |
| 8,156,304 B2 | 4/2012 | Friedman et al. |

(Continued)

FOREIGN PATENT DOCUMENTS

| CN | 102156738 A | 8/2011 |
| CN | 102291450 A | 12/2011 |
| CN | 102511043 A | 6/2012 |

OTHER PUBLICATIONS

PCT International Search Report and Written Opinion; International Application No. PCT/CN2013/084314; International Filing Date: Sep. 26, 2013; Date of Mailing: Jan. 2, 2014; pp. 1-10.

*Primary Examiner* — Reginald Bragdon
*Assistant Examiner* — Mehdi Namazi
(74) *Attorney, Agent, or Firm* — Cantor Colburn LLP; William A. Kinnaman, Jr.

(57) ABSTRACT

Embodiments relate to a system and computer program product for data management. An aspect includes a method for assigning storage types to data based on access frequency. Past or historical data associated with current data usage is also considered prior to assignment. Once data frequency access is determined, the current data is assigned to a first tier of a plurality of hierarchical ordered tiers, each tier corresponding to at least one class of storage. In one embodiment, there may be a condition that overrides the assignment with option to override it. The tier assignment may also be preserved so that the current data can be appropriately assigned in the future.

10 Claims, 3 Drawing Sheets

(51) Int. Cl.
*G06F 12/08* (2006.01)
*G06F 17/30* (2006.01)

(52) U.S. Cl.
CPC ............ *G06F3/0683* (2013.01); *G06F 3/0685* (2013.01); *G06F 17/30221* (2013.01)

(56) References Cited

U.S. PATENT DOCUMENTS

| | | | |
|---|---|---|---|
| 8,510,528 B2* | 8/2013 | Rubio et al. | 711/165 |
| 2003/0140207 A1 | 7/2003 | Nagase et al. | |
| 2009/0106518 A1* | 4/2009 | Dow | 711/165 |
| 2009/0300040 A1* | 12/2009 | Kaijima et al. | 707/101 |
| 2010/0235597 A1 | 9/2010 | Arakawa | |
| 2011/0149707 A1 | 6/2011 | Ozeki et al. | |
| 2011/0289287 A1* | 11/2011 | Yamamoto et al. | 711/156 |
| 2012/0137059 A1 | 5/2012 | Yang et al. | |
| 2012/0159097 A1 | 6/2012 | Jennas et al. | |
| 2012/0166749 A1 | 6/2012 | Eleftheriou et al. | |
| 2012/0173831 A1 | 7/2012 | Rubio et al. | |
| 2012/0185648 A1 | 7/2012 | Benhase et al. | |
| 2012/0210095 A1 | 8/2012 | Nellans et al. | |
| 2012/0215949 A1 | 8/2012 | Chiu et al. | |

* cited by examiner

MANAGEMENT OF DATA USING INHERITABLE ATTRIBUTES

BACKGROUND

The present disclosure relates generally to the field of data management using an application program interface (API) and more specifically to management of data using inheritable attributes.

An application program interface (API) is a technique by which a programmer writing an application program can make requests of the operating system or another application program. An API can be contrasted with a graphical user interface or a command interface. An API, similar to both graphical user interfaces and command interfaces, can be considered as a direct user interface to an operating system or a program.

A storage subsystem of a computer may include a variety of storage device types, often referenced as target devices. These devices may include physical memory, tape or even disk-based storage devices among others. Storage devices can be grouped in a hierarchical manner and include both high-cost and low-cost or performance based storage media.

Tier Storage Management (TSM) systems or other hierarchical data storage techniques automatically move data between high-cost and low-cost storage media. Such systems exist because high-speed storage devices, such solid state disk (flash technology) are more expensive than hard disk drive arrays, and have a high cost per byte stored. By contrast, slower devices, such as optical discs and magnetic tape drives are cheaper but have less speed and reduced performance associated with them.

It is ideal to have all data available on high-speed devices all the time, but this is cost prohibitive in many instances. Consequently, conventional hierarchical storage management (HSM) systems store the bulk of the data on slower devices, and subsequently copy data to faster disk drives accordingly and when needed. In this way, fast solid state disk drives are turned into caches for the slower mass storage devices. In order to effectively differentiate between fast and slow devices, HSM systems monitor the way data is used and make adjustments based on previous usage as to which data can safely be moved to slower devices as opposed to data that needs to stay on the fast devices.

BRIEF SUMMARY

Embodiments include a system and computer program product for data management. In one embodiment, access frequency of current data is determined with a processing device based on past or current usage. However, if the current data is associated to previous data access history such that knowledge of this previous data history needs to be considered, then the prior knowledge is combined with the current data history to provide an overall current access frequency. Subsequently, the current data is assigned based on its overall current access frequency to a first tier of a plurality of hierarchical ordered tiers, each tier corresponding to at least one class of storage. In one embodiment, it is also checked to see if a condition overrides the current data association to the first tier and if so, the current data is reassigned to a different tier of these tiers. In another embodiment, the tier assignment is preserved so that the current data can be appropriately assigned in future.

Additional features and advantages are realized through the techniques of the present disclosure. Other embodiments and aspects of the disclosure are described in detail herein.

For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

FIG. 2 is a flowchart illustration in accordance with an embodiment; and.

DETAILED DESCRIPTION

Figure 1:
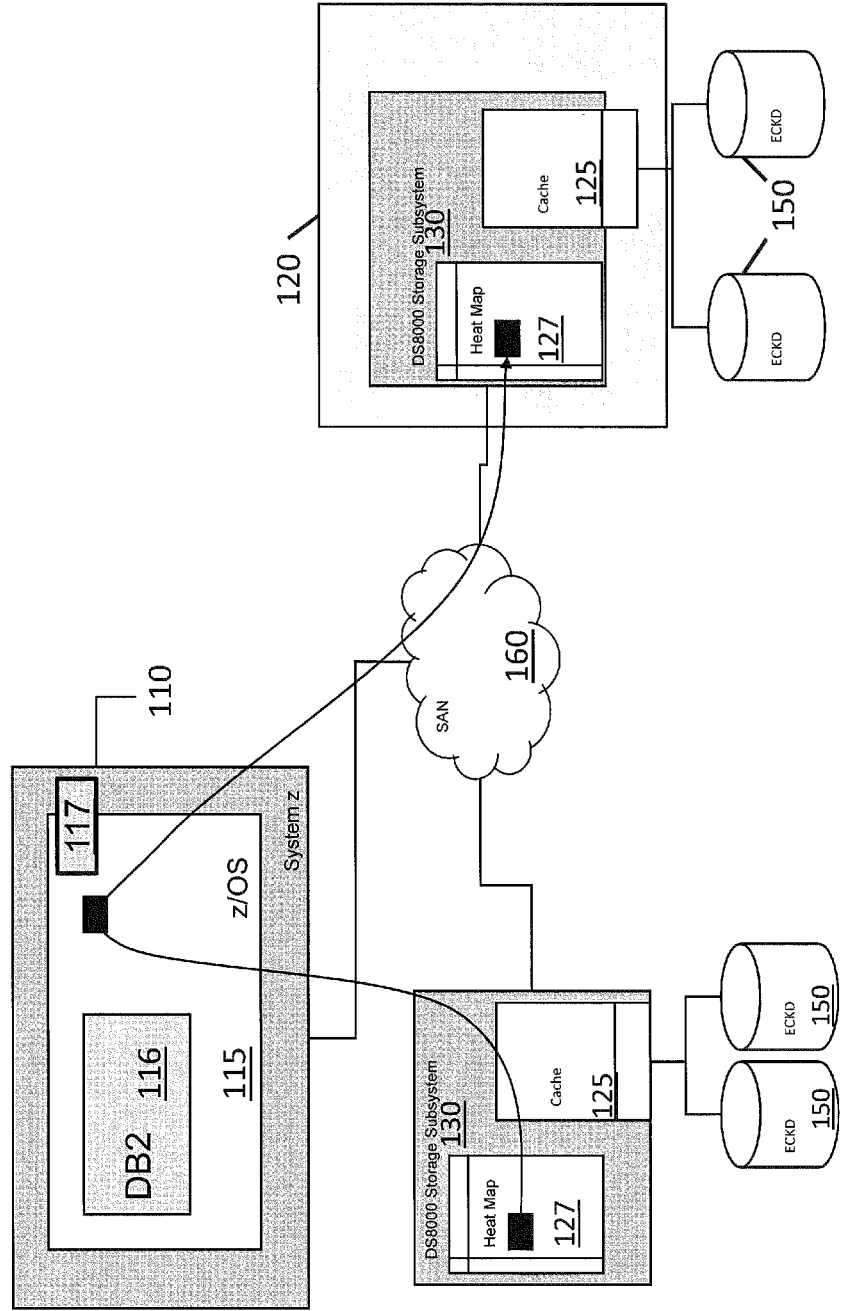
FIG. 1 depicts a block diagram illustrating memory access to data and a buffer, in accordance with an embodiment.

FIG. 1 is an illustration of a block diagram showing a directed data placement management technique as per one embodiment. In FIG. 1 one or more devices are in processing communication with one another. The devices shown can be a computer such as illustrated in 110 running one or more operating systems 115. Other devices can include other computers 120. Each computer 110 or 120 can represent a variety of digital devices, such as but not limited to mobile devices, desktop and laptop personal computers, servers or others such devices and can further include display, input/output interfaces, printers or other components as can be appreciated by those skilled in the art. In one embodiment, one or more computers 110 and 120 can have one or more processors 117.

The computers 110 and 120 can also include data management tools. In one embodiment, a storage subsystem 130 can be provided in processing communication with one or other computer. In one embodiment, the storage subsystem can be included as part of a computer. For clarity and ease of understanding, in the example of FIG. 1, the storage subsystem 130 is shown to be associated with computer 120. A storage subsystem can be thought of as a set of components that allow storage of data and programs in one or more types of storage. In the example of FIG. 1, a variety of storage options are provided and are in processing communication with the storage subsystem 120 as illustrated by numeral 150. The storage devices can include solid state disk, spinning hard disks (e.g. SATA, SAS), tape drives and tape libraries, optical devices and drives such as read only or rewriteable compact disks (CD/ROMs and CD/RWs) and digital versatile disks (DVDs), optical jukeboxes, disk arrays and floppy disk drives and other removable media drives such as flash drives. One or more storage devices can also be internal to computers 120. As an example, a cache 125 has been provided. There are many other types of storage, both internal and external, that can also be available as can be appreciated by those skilled in the art.

Normally one or more interfaces can also be included to provide internal communication channels used to convey information and data between computers 110 and 120, including to and from and storage subsystems 130.

In addition, in one embodiment storage area network (SAN) components 160 can provide processing communication in a more centralized manner between computers 110/120 and storage subsystems 130 to allow access to consolidated blocks of data storage in multiple storage subsystems 130 as shown. The purpose of providing processing communication between computers 110/120 and storage subsystems 130 together in a network allows data accessibility to servers and other digital devices both locally and remotely such that even remote devices appear like locally attached devices, especially to operating systems.

All storage subsystems in this embodiment can be in processing communication with one another and with one or more devices including storage and those that request processes such as operating systems and other computers. This enables data sharing among heterogeneous clients.

Data that is accessed or being transmitted can be categorized in a variety of different ways. For example, hot data can be characterized as data that is frequently accessed. In contrast, cold data is less frequently accessed and warm data can be defined as data that is being accessed more frequently than cold data but less frequently than hot data. Automatic tier management can be provided that will relocate data among the available storage tiers to achieve the best possible performance. For example, hot data may be stored in or moved to higher performance storage such as solid state disk storage which has higher input/output (I/O) rates and smaller service times to access the data. Warm data maybe moved to hard drives or tape drives using Serial Attached SCSI (SAS) technology, where SCSI is short for "Small Computer System Interface". SAS is a communication protocol that helps move data to and from computer storage devices such as hard and tape drives. It provides a point-to-point serial protocol and is also compatible with second-generation drives such as those using Serial ATA (SATA). SATA is used for cold data usually and is often used as a computer bus interface of choice when connecting host bus adapters to mass storage devices such as hard disk drives and optical devices. SATA allows a reduction in cable size and cost and provides for faster data transfers through higher signaling rates and a better I/O queuing protocol. SATA host-adapters and devices communicate via a high-speed serial cable and are very popular with use with consumer desk top and laptop computer.

A tiered storage management system such as an IBM's® EasyTier® can be used in one embodiment to assign storage hierarchies as per device and match them with certain type of data such as hot or cold data in every case. It is also possible to generate heat maps to delineate frequency of data access and the type of data being accessed. A heat map is a graphical representation of data where the individual values or set of values are represented in colors. Hierarchy, in this way can derive from representative colors. It is possible to use an automatic tier management system such that a heat map is used to automatically assign certain types of data to certain types of storage. In one embodiment as shown in FIG. 1, a heat map is provided as shown at 127.

There are times, however, where applications and even middleware may know beforehand that certain datasets or files will be best served by categorizing data in a particular tier or storage device, at least for a period of time, regardless of past or present usage patterns. For example in a relational data base management system, such as IBM's DB2, shown in FIG. 1 at 116, a database index should be placed in a certain tier. In DB2, a REORG table statement compresses the data associated with the specified table. These types of operations can involve fragmentation or reconstruction of fragmented data among others as can be appreciated by those skilled in the art. This is because in most cases, relational databases are very storage intensive. In such a case, then the DB2 table spaces that are being REORGed should end up in new table spaces at the same tier as the source, with the same heat map as the original source to allow reconstructing the table or the index to the table accurately. In the same manner, it can be desirable to keep table spaces and indexes needed for a long, complex query of the database in higher tier of storage for the duration of the query so access speed is maintain and no bottlenecks are caused. In other examples where dataset relocation is being processed (such as in FlashCopy, zDMFFF, TDMF, DSSSS copy, etc. as will be described later in detail) it may be desirable to preserve the same tier and same performance characteristics.

Other instances that may require selective assignment of data to tiers or storage devices can include volume virtualization where a logical volume is being relocated from one physical device to another. In such a case also it may be desired to preserve performance and tiering information to avoid needing to relearn over time. Many other examples and instances can be enumerated. For example, when an EasyTier system is used in conjunction with a heat map, migration of data to tape may involve preserving the same heat map and tiering data when it is brought back on-line.

The example used in FIG. 1 in one embodiment can be used in conjunction with IBM® products such as DS8000® which provides storage tier management and can include IBM Parallel Sysplex® technology which provides for a cluster of mainframes acting together as a single system image which increases data sharing and data performance and availability greatly. The embodiment of FIG. 1 can also help support the Hyperswap technology which extends Sysplex availability even further to data.

In one embodiment as provided in FIG. 1, a storage subsystem 130 can be implemented and associated APIs created that allow host software to query the tier information, read the heat map and write the heat map and pin data into a particular tier electively and alongside of automatically managed tiering assignments. To make this concept clear, an example will now be used with the understanding that in alternate embodiments many other similar variations can be provided.

As per an example, a REORG process in DB2 can be used. Using the embodiment provided in FIG. 1, steps can be taken to query both the tier information and the heat map before assigning the desired tier (and heat map) to target datasets, such as those associated with the REORG. The REORG is then performed and the result will preserve the tier and heat map information selected previously in order to maintain persistent, repeatable performance for the applications and middleware across the REORG. In other examples, same type of functional flow can be applied to processes and function including but not limited to defragmentation software and tools to reorganize disks (DEFRAG), migration software (such as database migration software zDMF, logical database migration software LDMF and transparent migration software TDMF), HSM and other hierarchical storage management functions, in this case as relating to z/OS, as well as data set services commands DSS and DFSMS, FlashCopy and HSM back/up and recall functions.

The embodiment of FIG. 1 provides for a technique where a variety of information is taken into account. For example, data frequency is considered and certain data is associated with hierarchy tiers and even storage options automatically in absence of other information. However, software or even a user can selectively elect certain data or group or variety of data to be always placed in a certain hierarchy and be associated with different storage options.

Data can be transferred, copied or recreated based on the processing of a number of actions including functions. Ordinarily, the copied or recreated data (i.e., current data) will not have historical data access information showing frequency of access. However, this copied or recreated data may not be new data because there may be historical access associated with the data from which it was transferred copied etc. Therefore, in one embodiment, historical data access associated with this current data is determined and the current data is updated to provide an overall access information for this current data that includes both current conditions and historical associations.

The latter can be done in a variety of ways such as providing a data manager (not illustrated) that can maintain hierarchical data access information based on frequency, such as by analyzing heat maps or other hierarchical graphical and non-graphical input. The computer or one of the processors can then update the hierarchical access of current data by using information, also referenced hereinafter as knowledge, provided by the data manager based on historical data access of any data related to the current data such as the source data from which current data is copied. The subsystem then makes the correct assignment of the current data to a storage tier based on access frequency of the current data and source data.

In some instances, however, the current data may only be created or updated after a particular time or the occurrence of an event. Therefore the correct tier assignment tier should await the occurrence of such condition. For example, the condition may be the performance of a function such as REORG, or a business policy trigger or some other directive such as a software directive. In such a case, an option can be provided to check for such condition and reassign data to different tiers as necessary. In another embodiment, an option allows election of the original assignment, despite existence of the overriding condition.

A condition may also include other concepts. For example, it may be desired that a data group A is maintained in a particular tier indefinitely or maintained in a particular tier for a time period such as for 90 days and then moved up or down according to new needs once the condition has expired. Certain data is also always grouped with other data including tables so that migration of one will affect the migration of the other from one storage to another and from one tier to another. The latter can be automated such as by heat map readings, or other forms of data frequency determination and for as long as one data group remains associated with a another data group.

Figure 2:
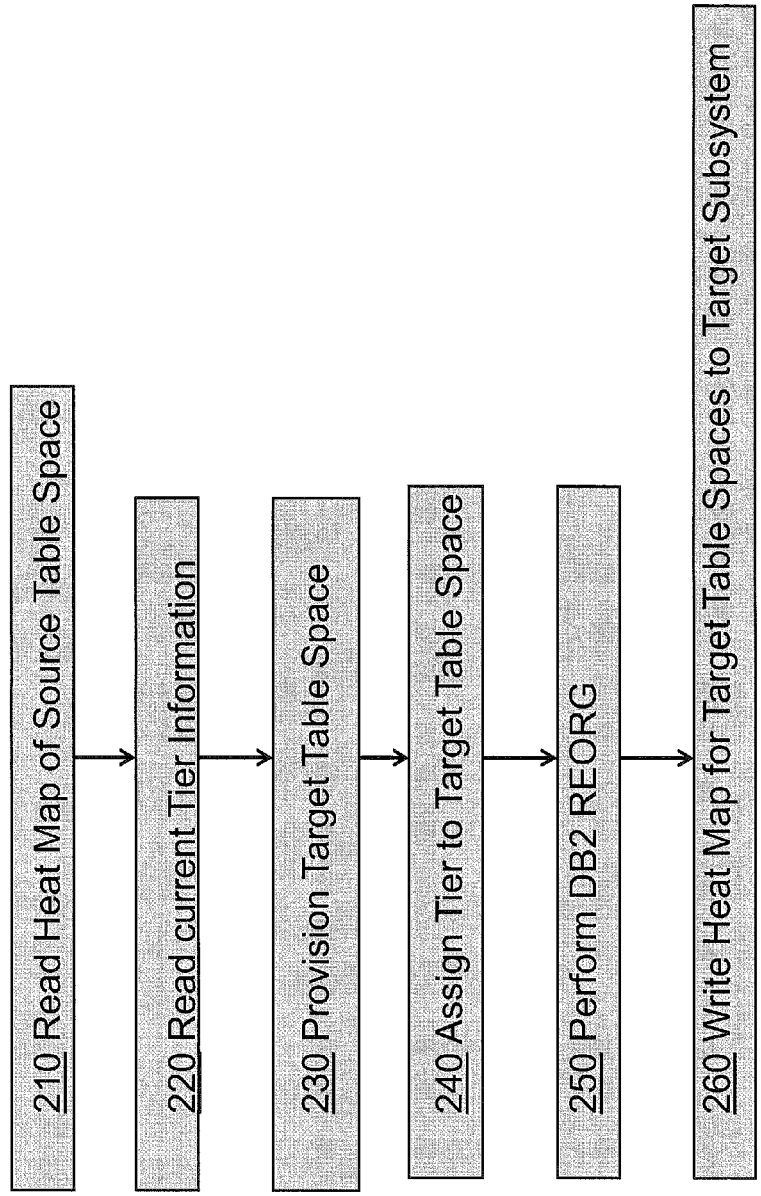
Figure 3:
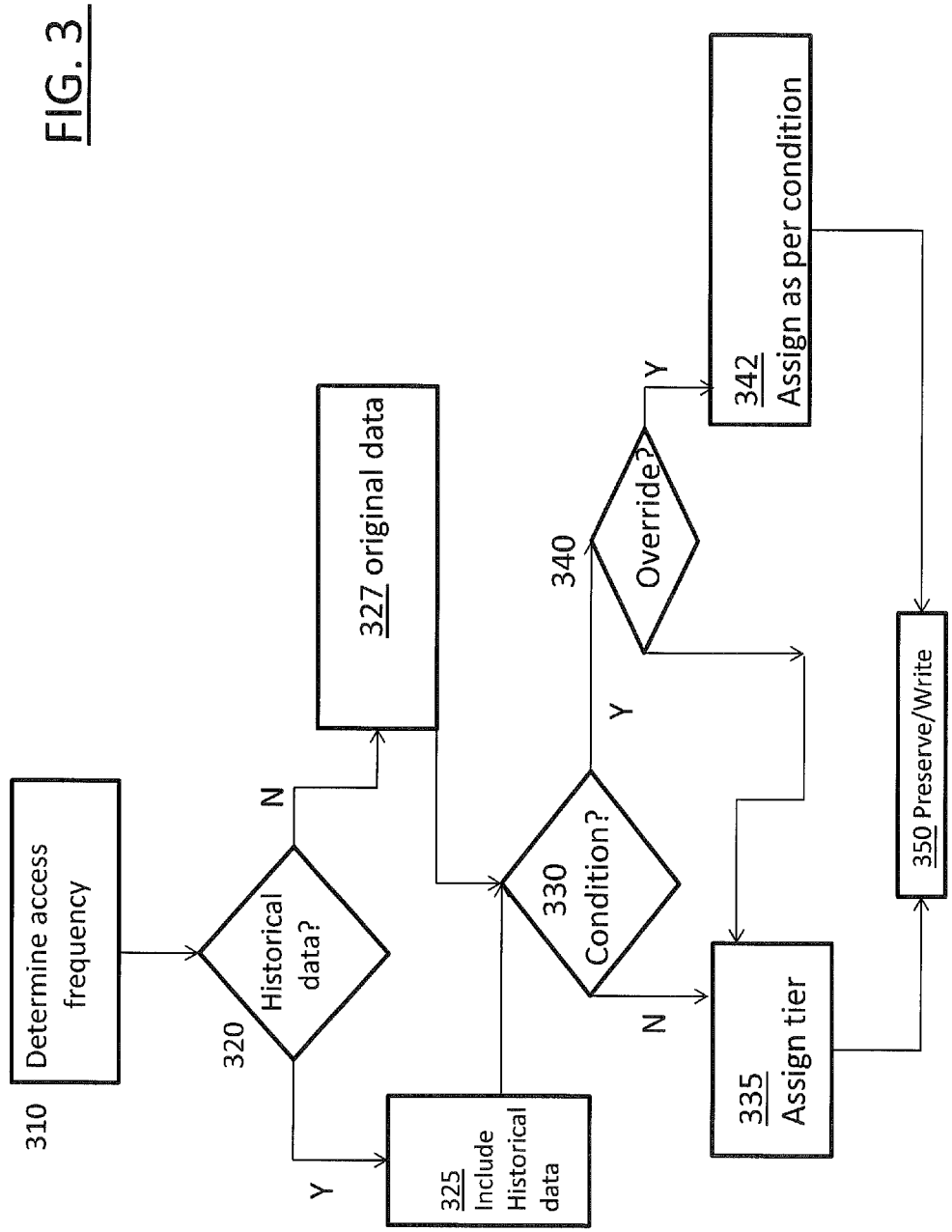
FIG. 3 is flowchart illustration in accordance with a different embodiment.

In either way, once current data is assigned to a particular tier and the information regarding access frequency is updated to reflect both historical and current access frequency, then the knowledge is preserved for future use. In other words, if new data is being created such as by copying or transferring as per one example, the updated heat map correctly provides historical data access associated with previous usage with what might have originally been tagged as new data. In this way, the historical information is pinned to the current data for future use. FIGS. 2 and 3 reflect different embodiments associated with this discussion.

In FIG. 3, a data management method is illustrated using a flowchart depiction. As shown, in block 310 the original access frequency of data (referred to as the current data to be accessed) is determined based on past or current usage. However, current data is also checked to see if it is associated to any previous historical data as shown in block 320 and this knowledge is then transferred to the current data and/or combined with it to provide an overall current data access frequency for the current data. The latter is shown in block 325. Otherwise, the current data remains the same when there is no historical knowledge to be transferred as shown in block 327. In block 330, conditions are checked and they either override assignment based on data access frequency (block 340/342) or in case an election is made to forgo the condition, assignments are made based on data frequency access as shown in block 335. Once tier assignments are completed, the new current data access frequency and the assignment information is preserved (write) for future use as indicated in block 360.

FIG. 2 is a flowchart illustration of operation as per one embodiment in an environment such as shown in FIG. 1. In block 210, the heat map of a source table space is read. In block 220, the current hierarchical information including tier information for the source table space is read. This information is reviewed to see if other conditions exist for handling and managing the data. In block 230 a target table space is allocated and provisioned. Then, in block 240, an appropriate tier is assigned to the target table space. The requested function such as the REORG in this case is then performed as viewed in block 250. In block 260, a heat map for the target table space is written to the target storage subsystem which is based on the heat map of the source table space and tier information assigned in the prior steps.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A non-transitory computer program product for data management, the computer program product comprising a computer readable storage medium having computer readable program code embodied therewith, said computer readable program code being executable by a processor to:

determine an access frequency of current data based on past or current usage; check to see if said current data is associated with previous data access history such that knowledge of said previous data access history needs to be combined with said current data access history to provide an overall current data access frequency;

assign said current data based on its overall current data access frequency to a first tier of a plurality of hierarchical ordered tiers, each tier corresponding to at least one class of storage;

check to see if a condition overrides said current data association with said first tier and, if so, reassign said current data to a different tier of said plurality of hierarchical ordered tiers; and preserve tier assignment and said overall current data access frequency of said current data so that said current data can be appropriately assigned in the future.

2. The computer program product of claim 1, wherein said condition further comprises assigning said first tier to said current data when a requested function is being processed and said tier assignment is made using a storage subsystem.

3. The computer program product of claim 2, wherein said condition has an election option to forgo overriding said tier assignment such that no reassignment is made.

4. The computer program product of claim 3, wherein said current data access frequency is determined by reading a heat map of a source table space and said requested function is a REORG function.

5. The computer program product of claim 4, wherein said tier assignment for said source table space is read and assigned to a target table space before said requested function is performed and said heat map for said target table space is then written to said storage subsystem.

6. A system for data management comprising:
a data manager configured to determine an access frequency of current data based on past or current usage and maintain hierarchical data access information based on the access frequency;
a processor configured to check to see if said current data is associated with previous data access history such that knowledge of said previous data access history needs to be combined with said current data access history to provide an overall current data access frequency;
a storage subsystem configured to assign said current data based on its overall current data access frequency to a first tier of a plurality of hierarchical ordered tiers, each tier corresponding to at least one class of storage;
said storage subsystem configured to check to see if a condition overrides said current data association with said first tier and, if so, reassign said current data to a different tier of said plurality of hierarchical ordered tiers, and preserve tier assignment and said overall current data access frequency of said current data so that said current data can be appropriately assigned in the future.

7. The system of claim 6, wherein said condition further comprises assigning said first tier to said current data when a requested function is being processed and said tier assignment is made using the storage subsystem.

8. The system of claim 7, wherein said condition has an election option to forgo overriding said tier assignment such that no reassignment is made.

9. The system of claim 8, wherein said current data access frequency is determined by reading a heat map of a source table space and said requested function is a REORG function.

10. The system of claim 9, wherein said tier assignment for said source table space is read and assigned to a target table space before said requested function is performed and said heat map for said target table space is then written to said storage subsystem.

* * * * *